(12) United States Patent
Kawada et al.

(10) Patent No.: US 7,551,198 B2
(45) Date of Patent: Jun. 23, 2009

(54) TRANSMITTED PICTURE QUALITY MONITORING APPARATUS

(75) Inventors: Ryoichi Kawada, Saitama (JP); Osamu Sugimoto, Saitama (JP); Atsushi Koike, Saitama (JP)

(73) Assignee: KDDI Corporation, Tokyo (JP)

( * ) Notice: Subject to any disclaimer, the term of this patent is extended or adjusted under 35 U.S.C. 154(b) by 927 days.

(21) Appl. No.: 11/059,543

(22) Filed: Feb. 17, 2005

(65) Prior Publication Data
US 2005/0206732 A1    Sep. 22, 2005

(30) Foreign Application Priority Data
Mar. 2, 2004    (JP)    .............................. 2004-057628

(51) Int. Cl.
*H04N 17/00*    (2006.01)
(52) U.S. Cl. ...................................... 348/192; 348/180
(58) Field of Classification Search ................. 348/180, 348/181, 192, 184; 382/191, 232, 286
See application file for complete search history.

(56) References Cited

U.S. PATENT DOCUMENTS

| | | | | |
|---|---|---|---|---|
| 5,134,633 A | * | 7/1992 | Werner ........................ | 375/260 |
| 5,446,492 A | * | 8/1995 | Wolf et al. ................... | 348/192 |
| 5,818,520 A | * | 10/1998 | Janko et al. ................. | 348/192 |
| 5,894,324 A | * | 4/1999 | Overton ...................... | 348/181 |
| 5,940,124 A | * | 8/1999 | Janko et al. ................. | 348/189 |
| 6,075,561 A | * | 6/2000 | Janko ......................... | 348/180 |
| 6,141,042 A | * | 10/2000 | Martinelli et al. ........... | 348/181 |
| 6,351,281 B1 | * | 2/2002 | Cooper ....................... | 348/192 |
| 6,400,400 B1 | * | 6/2002 | Isnardi et al. ............... | 348/180 |
| 6,483,538 B2 | * | 11/2002 | Hu ............................. | 348/180 |
| 6,577,764 B2 | * | 6/2003 | Myler et al. ................. | 382/228 |

FOREIGN PATENT DOCUMENTS

| | | |
|---|---|---|
| JP | 2003-009186 | 1/2003 |
| JP | 2003-087823 | 3/2003 |

* cited by examiner

*Primary Examiner*—Victor R Kostak
(74) *Attorney, Agent, or Firm*—Westerman, Hattori, Daniels & Adrian, LLP.

(57) ABSTRACT

A picture of 625/50 format is converted to a picture of 525/60 format by a format converter provided halfway of the transmission link (1). By thinning scanning lines from the 625/50 format with a scanning line thinning means (2) on an input side of the transmission link (1) and then thinning fields from the format of 525/60 with a field (frame) thinning means (4) on an output side, the formats are matched with each other. After that, a picture quality characteristic amount is extracted by picture quality characteristic amount extracting portions (3), (5) and transmitted to a central monitoring room (6). A comparing means (7) of the central monitoring room (6) compares received picture quality characteristic amount so as to monitor a transmitted picture quality on a transmission link.

12 Claims, 3 Drawing Sheets

FIELD NUMBER
TRANSFORMATION

LINE NUMBER
TRANSFORMATION

Fig. 3A
Fig. 3B
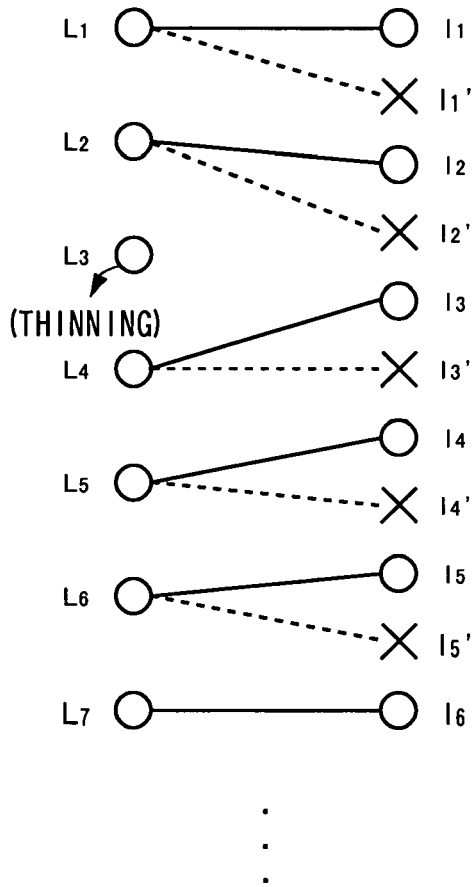
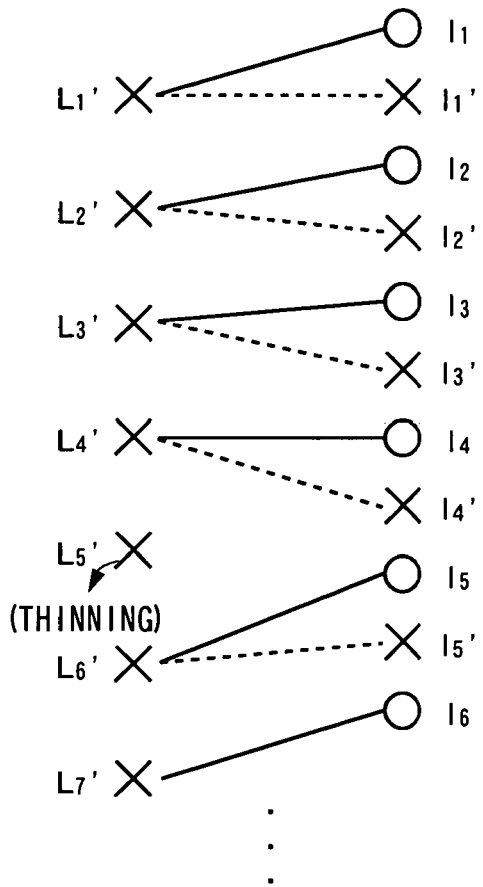
Fig. 4
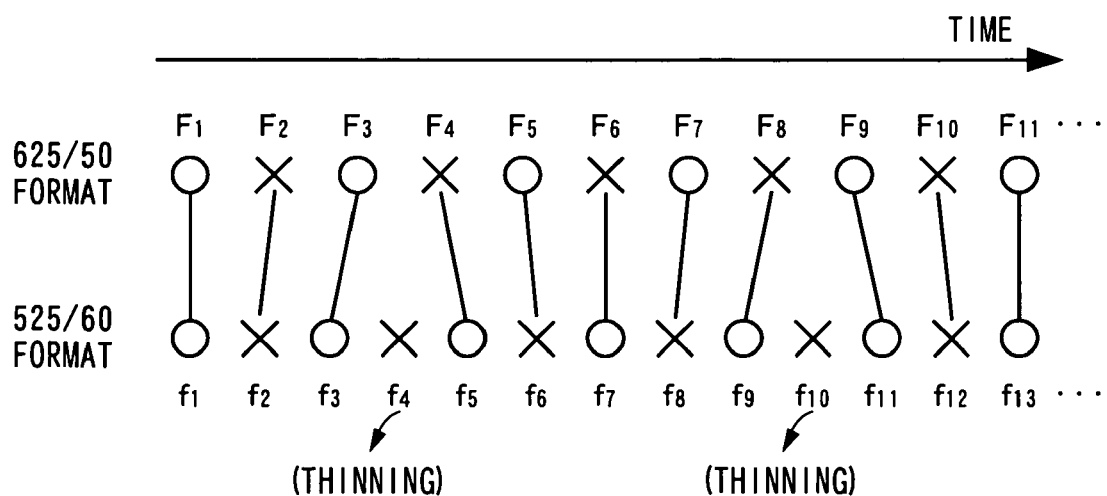

TRANSMITTED PICTURE QUALITY MONITORING APPARATUS

BACKGROUND OF THE INVENTION

1. Field of the Invention

The present invention relates to a transmitted picture quality monitoring apparatus and more particularly, to a transmitted picture quality monitoring apparatus for monitoring the transmitted picture quality on a transmission chain that includes a format converter, from a remote place by extracting the picture quality characteristic amount of a picture at each point of the transmission link and comparing the extracted picture quality characteristic amount.

2. Description of the Related Art

When monitoring the picture quality on a transmission chain, the picture quality characteristic amount of pictures at any point is extracted and the extracted picture quality characteristic amount are transmitted to a central control center and compared so as to monitor the transmitted picture quality on a transmission link in batch.

This inventor et al. have proposed a calculation method for the picture quality characteristic amount for monitoring the transmitted picture quality on a transmission link through patent documents 1, 2. According to this calculation method of the picture quality characteristic amount, a picture is divided to blocks each having a certain size and the picture of each block is orthogonally transformed so as to extract a transformation coefficient and the extracted transformation coefficient is transmitted to a central control center. This calculation method of the picture quality characteristic amount exerts its effect when as described in the patent documents 1, 2, spread spectrum is applied to a picture and then that picture is orthogonally transformed and the transformation coefficient is extracted and transmitted. The spread spectrum is realized by changing the sign of each pixel constituting a picture at random.

Patent document: Japanese Patent Application Laid-Open No. 2003-9186

Patent document: Japanese Patent Application Laid-Open No. 2003-87823

According to the inventions proposed in the patent documents 1, 2, deterioration in signal-to-noise ratio of a received picture due to coding noise and transmission errors in a transmission link can be estimated accurately.

However, if a format converter is included in a transmission chain and a picture is converted in terms of format halfway of the transmission link and transmitted, the number of lines constituting a screen, the number of fields or frames per second or the number of horizontal pixels are converted by a format converter.

The inventions proposed by the patent documents 1, 2 employ common ways of monitoring the quality of transmitted picture quality on a transmission link by comparing pictures on transmission side and reception side and for this comparison, estimating a mean square error (MSE) of a differential of each of pixels constituting a picture. This way presumes that the formats (number of scanning lines, number of fields, number of frames, and number of horizontal pixels) before and after transmission are matched with each other as understood from a fact that the differential of each pixel is obtained.

That is, because the inventions proposed by the patent documents 1, 2 presume that the format of a picture at each point of the transmission link is identical, if the format of a picture is converted halfway of the transmission link, pictures before and after the transformation of the format can not be compared with each other.

For example, in case where pictures are transmitted between Europe and Japan, the picture in Europe is based on the 625/50 format in which the number of the scanning lines (vertical lines) in a frame is 625 while the number of fields per second is 50 (the quantity of frames is 25). On the other hand, the picture in Japan is based on the 525/60 format in which the number of the scanning lines (vertical lines) in a frame is 525 while the number of fields per second is 60 (the number of frames is 30). The number of the horizontal pixels in the both formats are the same.

Because for transmission between countries with different picture formats, the format is converted during the transmission, there is left such a problem that the transmitted picture quality on a transmission link cannot be monitored from a remote place.

SUMMARY OF THE INVENTION

An object of the present invention is to provide a transmitted picture quality monitoring apparatus capable of monitoring a transmitted picture quality on a transmission link based on the picture quality characteristic amount of a picture on each point in the transmission chain that includes a format converter.

In order to accomplish the object, the first feature of this invention is that a transmitted picture quality monitoring apparatus for extracting a picture quality characteristic amount of a picture at each point of a transmission chain that includes a format converter, in which a transmitted picture quality on a transmission link is monitored by comparing the extracted picture quality characteristic amount, said transmitted picture quality monitoring apparatus comprises thinning means for thinning the scanning lines of picture at a certain point in a specified ratio, a first characteristic amount extracting means for extracting the picture quality characteristic amount of the picture from which the scanning lines are thinned with said thinning means, a second characteristic amount extracting means for extracting the picture quality characteristic amount of the picture at other point, and a comparing means provided in a central monitoring room and for comparing the picture quality characteristic amount extracted by said first and second characteristic amount extracting means.

Also, the second feature of this invention is that a transmitted picture quality monitoring apparatus for extracting a picture quality characteristic amount of a picture at each point of a transmission chain that includes a format converter, in which a transmitted picture quality on a transmission link is monitored by comparing the extracted picture quality characteristic amount, said transmitted picture quality monitoring apparatus comprises a thinning means for thinning the fields or frames of picture at a certain point in a specified ratio, a first characteristic amount extracting means for extracting the picture quality characteristic amount of the picture from which the fields or frames are thinned with said thinning means, a second characteristic amount extracting means for extracting the picture quality characteristic amount of the picture at other point, and a comparing means provided in a central monitoring room and for comparing the picture quality characteristic amount extracted by said first and second characteristic amount extracting means.

Also, the third feature of this invention is that a transmitted picture quality monitoring apparatus for extracting a picture quality characteristic amount of a picture at each point of a transmission chain that includes a format converter, in which a transmitted picture quality on a transmission link is monitored by comparing the extracted picture quality characteristic amount, said transmitted picture quality monitoring apparatus comprises a thinning means for thinning the horizontal pixels of picture at a certain point in a specified ratio, a first characteristic amount extracting means for extracting the picture quality characteristic amount of the picture from which the horizontal pixels are thinned with said thinning means, a second characteristic amount extracting means for extracting the picture quality characteristic amount of the picture at other point, and a comparing means provided in a central monitoring room and for comparing the picture quality characteristic amount extracted by said first and second characteristic amount extracting means.

Also, the fourth feature of this invention is that a transmitted picture quality monitoring apparatus for extracting the picture quality characteristic amount of a picture at each point of a transmission chain that includes a format converter, in which a transmitted picture quality on a transmission link is monitored by comparing the extracted picture quality characteristic amount, said transmitted picture quality monitoring apparatus comprises a first characteristic amount extracting means for extracting the picture quality characteristic amount of the picture at a certain point, a second characteristic amount extracting means for extracting the picture quality characteristic amount at other point, an aborting means provided in the central monitoring room for aborting the picture quality characteristic amount extracted by said first characteristic amount extracting means in a specified ratio, and a comparing means provided in said central monitoring room and for comparing the picture quality characteristic amount sent from said aborting means with the picture quality characteristic amount extracted by said second characteristic amount extracting means.

Also, the fifth feature of this invention is that said first and second picture quality characteristic amount extracting means comprise a block dividing portion for dividing an inputted picture to blocks of an arbitrary size, an orthogonal transforming portion for orthogonally transforming the picture in the block and a coefficient extracting portion for picking out orthogonally transformed arbitrary frequency component.

Also, the sixth feature of this invention is that said first and second picture quality characteristic amount extracting means comprise a block dividing portion for dividing an inputted picture to square blocks of the second power, an orthogonal transforming portion for orthogonally transforming the picture in the block and a coefficient extracting portion for picking out orthogonally transformed arbitrary frequency component.

According to the first to third features of the invention, before the picture quality characteristic amount for monitoring is extracted from each point of the transmission link, a picture composed of many scanning lines is thinned out by removing its scanning lines in a specified ratio and a picture composed of many fields or frames is thinned out by removing the fields or frames in a specified ratio and further, a picture composed of many horizontal pixels is thinned out by removing the horizontal pixels in a specified ratio. Consequently, a difference in picture format before and after format transformation can be eliminated so that pictures of the same format can be compared.

Thus, by extracting the picture quality characteristic amount of a picture after this thinning processing is carried out, transmitting this picture quality characteristic amount from each point and comparing respective quantities of picture quality characteristic transmitted from respective points in a central monitoring room, even if the picture format is converted during a transmission, the transmitted picture quality on a transmission link can be monitored from a remote place.

According to the fourth feature of the present invention, before the picture quality characteristic amount for monitoring is extracted from each point of the transmission link, a picture composed of many scanning lines at each point of the transmission link is thinned out by removing the scanning lines in a specified ratio and further, a picture composed of many horizontal pixels is thinned out by removing the horizontal pixels in a specified ratio. After this thinning processing, the picture quality characteristic amount is extracted and transmitted from each point to the central monitoring room.

At this time, excessive picture quality characteristic amount reach the central monitoring room from a point transmitting a picture composed of many fields or frames. However, the central monitoring room abolishes that excessive the picture quality characteristic amount in a specified ratio. Consequently, a difference in picture format between before and after the format transformation can be eliminated, so that a picture of the same format can be compared falsely.

According to the fifth feature of the present invention, because each block is orthogonally transformed after a picture is divided to blocks of an arbitrary size when the picture quality characteristic amount is extracted, the calculation amount of the orthogonal transformation per once can be reduced. Further, by picking out a certain frequency component of the orthogonal transformation and using it for estimation, deterioration can be estimated more highly accurately as compared to a case where signals before the transformation are picked out in the same quantity by thinning out.

If spread spectrum is carried out on a picture before the orthogonal transformation, noises having a deflection in frequency characteristic can be spread in terms of frequency. After that, by picking out the value of a frequency component by orthogonal transformation and obtaining a differential between the transmission side value and reception side value, the sample of that noise indicates an average value of noise more suitable as a representative. That is, automatic remote monitoring of a transmitted picture quality can be achieved at a higher accuracy.

According to the sixth feature of the present invention, because the orthogonal transformation of a size of the second power can be applied to a screen of an arbitrary size, the transmitted picture quality monitoring apparatus can be simplified. Further, when dividing a picture to blocks, by sampling not adjoining pixels but pixels far away from each other so as to compose each block, a wide range of the picture can be covered with a relatively small block so that it can be monitored. As a result, the transmitted picture quality monitoring apparatus can be simplified.

BRIEF DESCRIPTION OF THE DRAWINGS

FIG. 3 is a conceptual diagram showing specifically thinning processing of scanning lines;

FIG. 4 is a conceptual diagram showing specifically the thinning processing of field (frame);

DETAILED DESCRIPTION OF THE PREFERRED EMBODIMENTS

The present invention will be described in detail with reference to the accompanying drawings. A case of monitoring a transmitted picture quality on a transmission chain that includes a format converter for converting pictures of 625/50 format to pictures of 525/60 format from a remote place will be described below, however, the invention is not restricted to this example and may be applied to a case for monitoring the transmitted picture quality on the transmission chain that includes conversion between the other formats.

Figure 1:
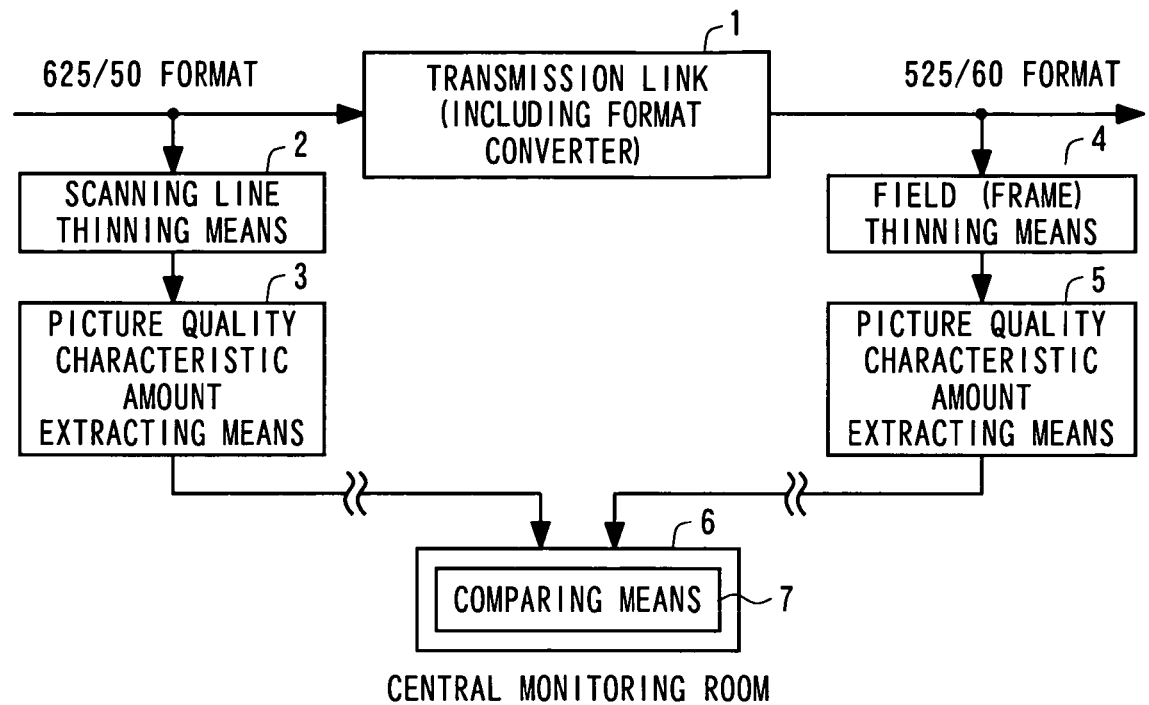
FIG. 1 is a block diagram showing a first embodiment of the transmitted picture quality monitoring apparatus of the present invention.

FIG. 1 is a block diagram showing a first embodiment of the transmitted picture quality monitoring apparatus of the invention. According to the first embodiment, scanning lines are thinned from the 625/50 format and then fields are thinned from the 525/60 format so as to match those formats apparently. After that, by extracting and comparing the picture quality characteristic amount, the transmitted picture quality on a transmission link is monitored.

Pictures of 625/50 format are transformed to pictures of 525/60 format by a format converter provided halfway of a transmission link 1. FIG. 2 is a diagram showing a difference in field (a) and scanning line (b) between the 625/50 format and the 525/60 format and a concept of format conversion between the two. As described above, according to the 625/50 format, 625 scanning lines (vertical lines) exist in a frame and 50 fields (25 frames) exist for a second. According to the 525/60 format, 525 scanning lines (vertical lines) exist in a frame while 60 fields (30 frames) exist in a second.

Figure 2A:
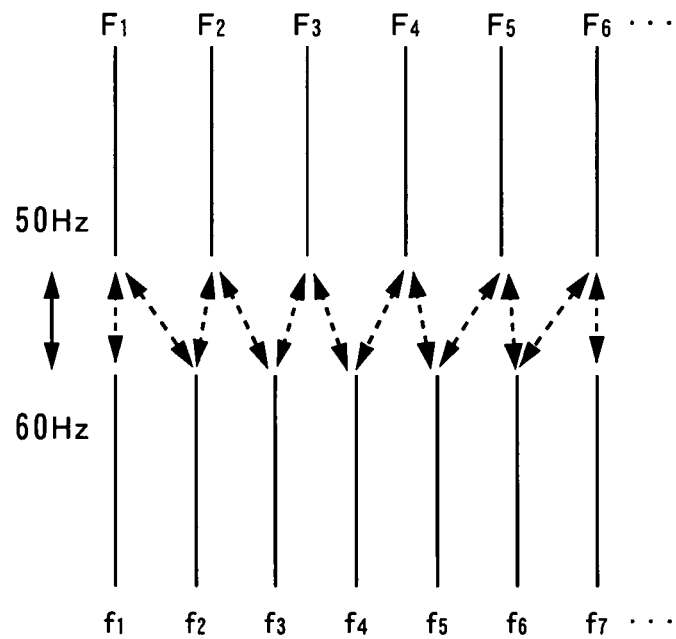
FIG. 2 is a diagram showing a difference in scanning line between 625/50 format and 525/60 format and concept of format transformation between the both.
Figure 2B:
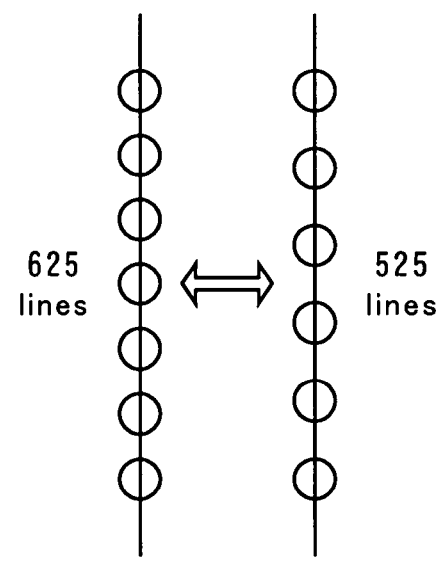

The conversion between the 625/50 format and the 525/60 format is carried out by estimating other format field or scanning lines from a certain format field or scanning lines. If as shown in FIG. 2(a), fields of the 625/50 format are expressed as $F_1, F_2, F_3, \ldots$ successively and fields of the 525/60 format are expressed as $f_1, f_2, f_3 \ldots$ successively, for example, a field $f_2$ is estimated from fields $F_1$ and $F_2$ and a field $f_3$ is estimated from fields $F_2$ and $F_3$. To the contrary, a field $F_2$ is estimated from fields $f_2$ and $f_3$ and a field $F_3$ is estimated from fields $f_3$ and $f_4$. The same thing can be said of the scanning lines (conversion of the number of lines in FIG. 2(b)).

To monitor the transmitted picture quality on the transmission link, a picture on the input side of the transmission link 1 is extracted and inputted to a picture quality characteristic amount extracting means 3 through a scanning line thinning means 2. Further, a picture on the output side of the transmission link 1 is extracted and inputted to a picture quality characteristic amount extracting means 5 through a field (frame) thinning means 4.

The picture quality characteristic amount extracted by the picture quality characteristic amount extracting means 3, 5 is transmitted to a central monitoring room 6 through a low-speed kink such as telephone network and LAN network. The central monitoring room 6 includes a comparing means 7 and by comparing a received picture quality characteristic amount with this comparing means 7, monitors the transmitted picture quality on a transmission link remotely. For this comparison, for example, mean square error (MSE) is used.

Next, the processing by the scanning line thinning means 2 will be described. For the reason for monitoring transmitted picture quality on a transmission link by comparing pictures before and after transmission through the transmission link 1, scanning lines of comparing objects which are to be compared with the comparing means 7 of the central monitoring room 6 are required to be located as near each other as possible.

The scanning line thinning means 2 achieves this. FIG. 3 is a conceptual diagram showing specifically the thinning processing with the scanning line thinning means 2. In the meantime, ○ indicates a scanning line in an odd field and X indicates a scanning line in an even field. FIG. 3(a) shows a case in which the scanning lines in the odd field of the 525/60 format are matched with the scanning lines in the odd field of the 625/50 format (solid line) while the scanning lines in the even field are matched therewith (dotted line). FIG. 3(b) shows a case in which the scanning lines in the odd field of the 525/60 format are matched with the scanning lines in the even field of the 625/50 format (solid line) while the scanning lines in the even field are matched therewith (dotted line).

If the scanning lines in the odd field of the 625/50 format are expressed as $L_1, L_2, L_3, \ldots$ successively and the scanning lines in the even field are expressed as $L_1', L_2', L_3' \ldots$ while the scanning lines in the odd field of the 525/60 format are expressed as $l_1, l_2, l_3, \ldots$ successively and the scanning lines in the even field are expressed as $l_1', l_2', l_3' \ldots$, in case of the odd field of the 625/50 format, the scanning line $L_3$ at a third line is thinned out and in case of the even field, the scanning line $L_5'$ at a fifth line is thinned out. After that, the scanning line of a single line is thinned out every six lines.

Consequently, a difference in distance between the positions of the scanning lines of comparison object is 0.8 lines max. (calculated under the 625/50 format) and as a consequence, by comparing the scanning lines at a practically sufficient accuracy, the transmitted picture quality on a transmission link can be monitored.

Next, a processing with the field (frame) thinning means 5 will be described. For the reason for monitoring transmitted picture quality on a transmission link 1 by comparing pictures before and after transmission through the transmission link 1, scanning lines of comparing objects which are to be compared with the comparing means 7 of the central monitoring room 6 are required to be located as near each other as possible.

The field (frame) thinning means 5 achieves this. FIG. 4 is a conceptual diagram showing specifically the thinning processing with the field (frame) thinning means 5. In the meantime, ○ indicates a scanning line in an odd field and X indicates a scanning line in an even field. If fields in the 625/50 format are expressed as $F_1, F_2, F_3, \ldots$ while fields in the 525/60 format are expressed as $f_1, f_2, f_3, \ldots$, a screen $f_4$ at a fourth field from the left (assume that the field matches at the left end) of the 525/60 format is thinned out and after that, a screen of each field is thinned out every six fields.

Consequently, the difference in distance between the positions of screens of comparison object is 0.5 fields (calculated under the 525/60 format) and as a consequence, by comparing the screens at a practically sufficient accuracy, the transmitted picture quality on a transmission link can be monitored.

In this case, because there exists a delay of processing in transmission through the transmission link 1, the relation of relative positions between field before and after transmission is not evident from the beginning. Therefore, that relation of the relative positions need to be known separately. One method for knowing this is a method by referring to a time code existing in an auxiliary data area overlaid in a digital picture signal to be transmitted. If the time code is referred to on the output side of the transmission link 1, that is, on the side of the 525/60 format so as to determine at which field number the screen should be thinned out, the above-described thinning processing is enabled.

If no time code is provided, the 525/60 format side disables to know which field should be thinned out as an optimum way. In this case, thinned fields only should be selected in the central monitoring room 6 as the second embodiment of the present invention is described below.

Figure 5:
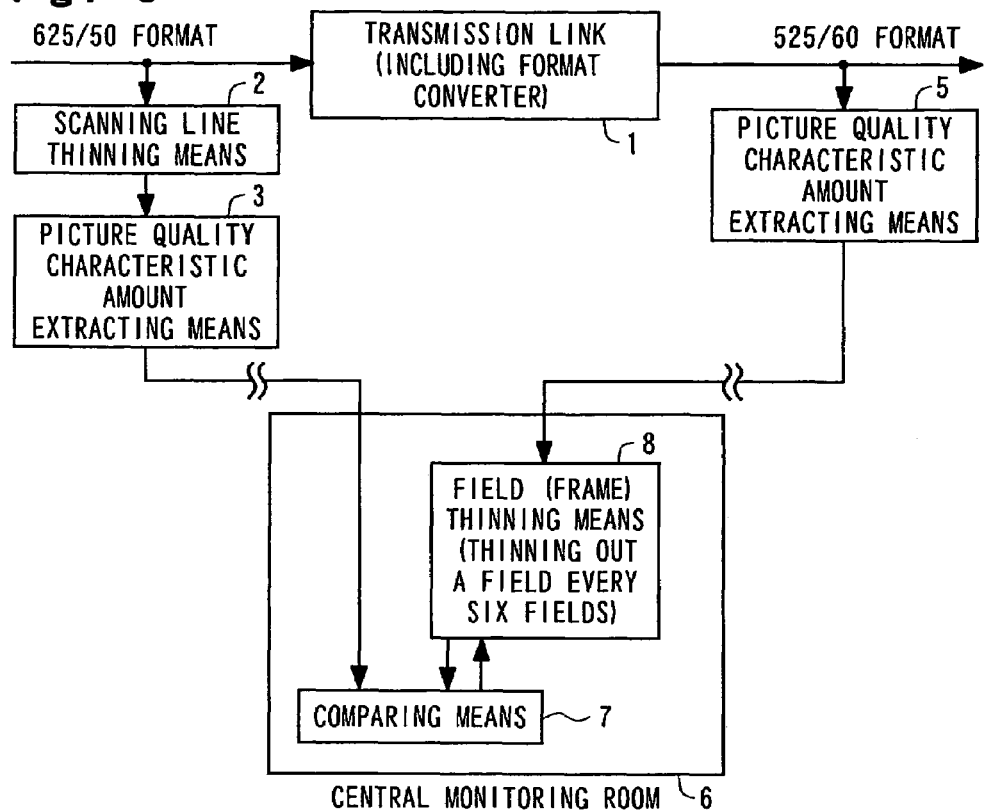
FIG. 5 is a block diagram showing a second embodiment of the transmitted picture quality monitoring apparatus of the invention.

FIG. 5 is a block diagram showing the second embodiment of the transmitted picture quality monitoring apparatus of the present invention. Like reference numerals are attached to the same or similar component as FIG. 1. According to the second embodiment, the field is not thinned out on the 525/60 format side on that site and because the central monitoring room 6 is capable of discriminating which field a received picture quality characteristic amount belongs to, the fields are thinned out at the stage of the picture quality characteristic amount.

This embodiment is the same as the first embodiment in that a picture on the input side of the transmission link 1 is extracted, the scanning line is thinned out with the scanning line thinning means 2, the picture quality characteristic amount is extracted with the picture quality characteristic amount extracting means 3 and transmitted to the central monitoring room 6.

However, this embodiment is different in that thinning of the field (frame) is not executed on the output side of the transmission link 1 but a picture extracted from the transmission link 1 is inputted into the picture quality characteristic amount extracting means 5 as it is and then the extracted picture quality characteristic amount is transmitted to the central monitoring room 6.

The 525/60 format has more fields than the 625/50 format in the ratio of 6:5 and therefore, the picture quality characteristic amount extracted by the picture quality characteristic amount extracting means 5 is more in this ratio. Thus, before the picture quality characteristic amount transmitted from the picture quality characteristic amount extracting means 3, 5 is compared with the comparing means 7 in the central monitoring room 6, the picture quality characteristic amount transmitted from the picture quality characteristic amount extracting portion 5 is inputted to the field (frame) thinning means 8 and a field is thinned out every six fields. This is enabled because it can be presumed from which field each picture quality characteristic amount is extracted.

Figure 6:
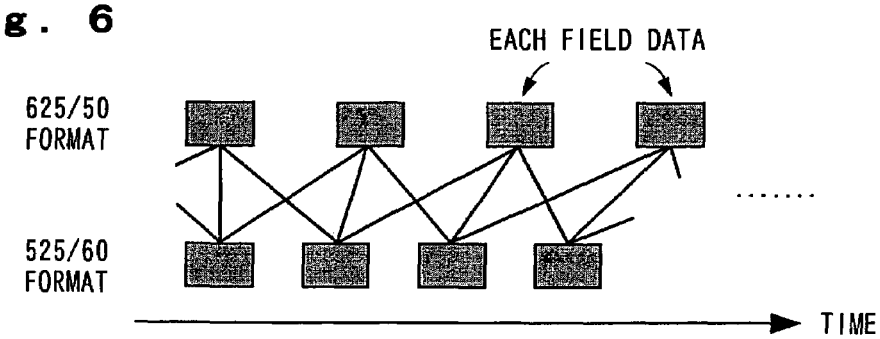
FIG. 6 is a diagram showing the concept of a processing for determining a field to be thinned.

Next, a processing for determining a thinning field with the field (frame) thinning means 8 will be described specifically. FIG. 6 is a diagram showing the concept for this determination processing.

The top row of FIG. 6 indicates each field data based on the 625/50 format and the bottom row indicates each field data based on the 525/60 format. As indicated with solid line, first, a differential absolute sum of the both is calculated by matching the respective field data with each other. A combination in which this differential absolute sum minimizes can be judged to be the nearest fields. Consequently, by correcting time positions in this way, a corresponding field can be found out. After the corresponding field is found out, the field should be selected as indicated in FIG. 4. That is, first, a screen $f_4$ at a fourth field from the left is thinned out and then, a field is thinned out every six fields.

Because the 625/50 format and the 525/60 format of this embodiment have equal horizontal pixels, the thinning of the horizontal pixels is not necessary, however, if the quantity of the horizontal pixels changes as a result of format transformation, the horizontal pixels are thinned out in the same way.

Figure 7:
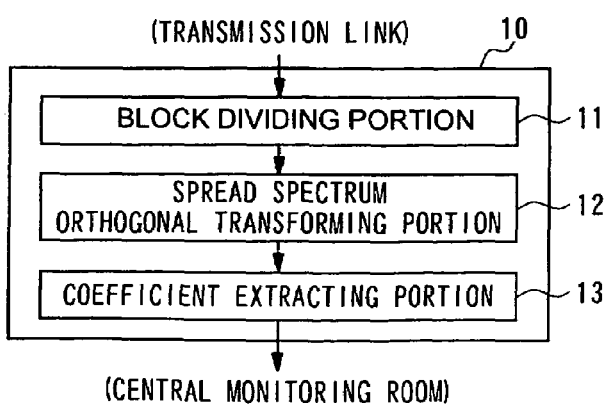
FIG. 7 is a block diagram showing an example of the configuration of the picture quality characteristic extracting portion.

The structure of the picture quality characteristic quantity extracting portion (picture quality characteristic amount extracting means 3, 5 of this embodiment) may be equal to the structure described in the patent documents 1, 2. FIG. 7 is a block diagram showing the picture quality characteristic amount extracting portion 10 described in the patent document 1. The picture quality characteristic amount extracting portion 10 of this example is capable of extracting a high precision picture quality characteristic amount with a small calculation amount and comprises a block dividing portion 11, an orthogonal transforming portion 12 and a coefficient extracting portion 13.

The block dividing portion 11 divides an inputted picture to blocks of arbitrary size and the block dividing means and the orthogonal transforming portion 12 transform a picture in a block orthogonally and the coefficient extracting portion 13 picks up an orthogonally transformed arbitrary frequency component value. In the meantime, it is permissible to spread noises having a deflecting frequency characteristic in terms of frequency by spread spectrum after dividing the block and after that, orthogonally transform.

Because this structure orthogonally transforms for each block after the picture is divided to block of arbitrary size upon extracting the picture quality characteristic amount, the calculation amount for orthogonal transformation of each time can be reduced. Further, by picking out and using a certain frequency component subjected to the orthogonal transformation for estimation, deterioration can be estimated more highly accurately as compared with a case in which signals before transformation are picked out by thinning out. The reason is that deterioration in picture quality such as coding noise of a measurement object often exists over a wide frequency band.

Further, the picture quality characteristic amount extracting portion described in the patent document 2 can be adopted. The picture quality characteristic amount extracting portion described in this patent document enables high-speed orthogonal transformation, which is relatively easy to realize in a mechanical unit, to be used and comprises the block dividing portion, the orthogonal transforming portion and the coefficient extracting portion as indicated in FIG. 7. The block dividing portion divides an inputted picture to a square block of the second power, the orthogonal transforming portion transforms a picture in a block orthogonally and the coefficient extracting portion picks up orthogonally transformed arbitrary frequency component value.

A square block of the second power is constructed by burying a predetermined value in a block including out of an effective screen of a picture. For the block in which the predetermined value is buried, assuming that the block area is S and the area in which the predetermined value is buried of the block area S is K, the mean square error (MSE) calculated by the central monitoring room 6 is corrected to $S/(S-K)$ ·MSE.

Further, when the inputted picture is divided to square block of the second power by the block dividing portion, each block can be constructed by sampling separate pixels.

Because this structure enables orthogonal transformation for a size of the second power to be applied to a screen of arbitrary size, the transmitted picture quality monitoring apparatus can be simplified. Further, by constructing each block by sampling not pixels adjacent but pixels far away when dividing a picture to blocks, a wide range of the screen can be monitored by covering with relatively small size blocks, so that the transmitted picture quality monitoring apparatus can be simplified.

As described above, according to the present invention, pictures having different number of the scanning lines (vertical lines), number of the fields (frames) or number of the horizontal pixels are transmitted to the central monitoring room and compared with each other after thinning the scanning lines, fields (frames) or pixels from a picture on a side having more and extracting the picture quality characteristic amount, even if a picture type transformer is provided halfway of a transmission link, the transmitted picture quality on the transmission link can be monitored.

Further, according to the present invention, pictures having different number of the scanning lines (vertical lines), number of fields (frames) or number of horizontal pixels are transmitted to the central monitoring room after thinning the scanning lines or pixels from a picture on a side having more scanning lines (vertical lines) or horizontal pixels and the central monitoring room thins a picture quality characteristic amount transmitted from the side having more fields (frames) and compares. As a result, even if the picture type converter is provided halfway of the transmission link, the transmitted picture quality on the transmission link can be monitored.

What is claimed is:

1. A transmitted picture quality monitoring apparatus for extracting a picture quality characteristic amount of a picture at each point of a transmission chain that includes a format converter, in which a transmitted picture quality on a transmission link is monitored by comparing the extracted picture quality characteristic amount, said transmitted picture quality monitoring apparatus comprising:
    a thinning means for thinning the scanning lines of picture at a certain point in a specified ratio;
    a first characteristic amount extracting means for extracting the picture quality characteristic amount of the picture from which the scanning lines are thinned with said thinning means;
    a second characteristic amount extracting means for extracting the picture quality characteristic amount of the picture at other point; and
    a comparing means provided in a central monitoring room and for comparing the picture quality characteristic amount extracted by said first and second characteristic amount extracting means.

2. A transmitted picture quality monitoring apparatus for extracting a picture quality characteristic amount of a picture at each point of a transmission chain that includes a format converter, in which a transmitted picture quality on a transmission link is monitored by comparing the extracted picture quality characteristic amount, said transmitted picture quality monitoring apparatus comprising:
    a thinning means for thinning the fields or frames of picture at a certain point in a specified ratio according to conversion with the format converter;
    a first characteristic amount extracting means for extracting the picture quality characteristic amount of the picture from which the fields or frames are thinned with said thinning means;
    a second characteristic amount extracting means for extracting the picture quality characteristic amount of the picture at other point; and
    a comparing means provided in a central monitoring room and for comparing the picture quality characteristic amount extracted by said first and second characteristic amount extracting means.

3. A transmitted picture quality monitoring apparatus for extracting a picture quality characteristic amount of a picture at each point of a transmission chain that includes a format converter, in which a transmitted picture quality on a transmission link is monitored by comparing the extracted picture quality characteristic amount, said transmitted picture quality monitoring apparatus comprising:
    a thinning means for thinning the horizontal pixels of picture at a certain point in a specified ratio;
    a first characteristic amount extracting means for extracting the picture quality characteristic amount of the picture from which the horizontal pixels are thinned with said thinning means;
    a second characteristic amount extracting means for extracting the picture quality characteristic amount of the picture at other point; and
    a comparing means provided in a central monitoring room and for comparing the picture quality characteristic amount extracted by said first and second characteristic amount extracting means.

4. A transmitted picture quality monitoring apparatus for extracting the picture quality characteristic amount of a picture at each point of a transmission chain that includes a format converter, in which a transmitted picture quality on a transmission link is monitored by comparing the extracted picture quality characteristic amount, said transmitted picture quality monitoring apparatus comprising:
    a first characteristic amount extracting means for extracting the picture quality characteristic amount of the picture at a certain point;
    a second characteristic amount extracting means for extracting the picture quality characteristic amount at other point;
    an aborting means provided in the central monitoring room for aborting the picture quality characteristic amount extracted by said first characteristic amount extracting means in a specified ratio according to conversion with the format converter; and
    a comparing means provided in said central monitoring room and for comparing the picture quality characteristic amount sent from said aborting means with the picture quality characteristic amount extracted by said second characteristic amount extracting means.

5. The transmitted picture quality monitoring apparatus according to claim 1 wherein said first and second picture quality characteristic amount extracting means comprise a block dividing portion for dividing an inputted picture to blocks of an arbitrary size, an orthogonal transforming portion for orthogonally transforming the picture in the block and a coefficient extracting portion for picking out orthogonally transformed arbitrary frequency component.

6. The transmitted picture quality monitoring apparatus according to claim 2 wherein said first and second picture quality characteristic amount extracting means comprise a block dividing portion for dividing an inputted picture to blocks of an arbitrary size, an orthogonal transforming portion for orthogonally transforming the picture in the block and a coefficient extracting portion for picking out orthogonally transformed arbitrary frequency component.

7. The transmitted picture quality monitoring apparatus according to claim 3 wherein said first and second picture quality characteristic amount extracting means comprise a block dividing portion for dividing an inputted picture to blocks of an arbitrary size, an orthogonal transforming portion for orthogonally transforming the picture in the block and a coefficient extracting portion for picking out orthogonally transformed arbitrary frequency component.

8. The transmitted picture quality monitoring apparatus according to claim 4 wherein said first and second picture quality characteristic amount extracting means comprise a block dividing portion for dividing an inputted picture to blocks of an arbitrary size, an orthogonal transforming portion for orthogonally transforming the picture in the block and a coefficient extracting portion for picking out orthogonally transformed arbitrary frequency component.

9. The transmitted picture quality monitoring apparatus according to claim 1 wherein said first and second picture quality characteristic amount extracting means comprise a block dividing portion for dividing an inputted picture to square blocks of the second power, an orthogonal transforming portion for orthogonally transforming the picture in the block and a coefficient extracting portion for picking out orthogonally transformed arbitrary frequency component.

10. The transmitted picture quality monitoring apparatus according to claim 2 wherein said first and second picture quality characteristic amount extracting means comprise a block dividing portion for dividing an inputted picture to square blocks of the second power, an orthogonal transforming portion for orthogonally transforming the picture in the block and a coefficient extracting portion for picking out orthogonally transformed arbitrary frequency component.

11. The transmitted picture quality monitoring apparatus according to claim 3 wherein said first and second picture quality characteristic amount extracting means comprise a block dividing portion for dividing an inputted picture to square blocks of the second power, an orthogonal transforming portion for orthogonally transforming the picture in the block and a coefficient extracting portion for picking out orthogonally transformed arbitrary frequency component.

12. The transmitted picture quality monitoring apparatus according to claim 4 wherein said first and second picture quality characteristic amount extracting means comprise a block dividing portion for dividing an inputted picture to square blocks of the second power, an orthogonal transforming portion for orthogonally transforming the picture in the block and a coefficient extracting portion for picking out orthogonally transformed arbitrary frequency component.

* * * * *